United States Patent
Dix et al.

(10) Patent No.: US 12,185,651 B2
(45) Date of Patent: Jan. 7, 2025

(54) SYSTEM AND METHOD FOR ADJUSTING SWATH LINES FOR A WORK VEHICLE

(71) Applicant: CNH Industrial America LLC, New Holland, PA (US)

(72) Inventors: Phillip Duane Dix, Westmont, IL (US); Daniel Geiyer, Oshkosh, WI (US); Aditya Singh, Bolingbrook, IL (US); Navneet Gulati, Naperville, IL (US)

( * ) Notice: Subject to any disclaimer, the term of this patent is extended or adjusted under 35 U.S.C. 154(b) by 287 days.

(21) Appl. No.: 17/560,959

(22) Filed: Dec. 23, 2021

(65) Prior Publication Data
US 2023/0200279 A1    Jun. 29, 2023

(51) Int. Cl.
*A01B 69/00* (2006.01)
*G05D 1/00* (2006.01)
*G05D 1/02* (2020.01)

(52) U.S. Cl.
CPC ......... *A01B 69/004* (2013.01); *G05D 1/0219* (2013.01)

(58) Field of Classification Search
CPC .. G08G 5/0082; G08G 5/0013; G08G 5/0026; G08G 5/0056; G01S 13/88; G01S 13/782; G01S 13/91; G01S 7/412
See application file for complete search history.

(56) References Cited

U.S. PATENT DOCUMENTS

| | | | |
|---|---|---|---|
| 6,377,872 B1 * | 4/2002 | Struckman | E02F 9/205 700/258 |
| 6,804,597 B1 | 10/2004 | Posselius et al. | |
| 7,162,348 B2 | 1/2007 | McClure et al. | |
| 7,505,848 B2 | 3/2009 | Flann et al. | |
| 7,715,979 B2 * | 5/2010 | Dix | G05D 1/0278 701/519 |
| 7,747,370 B2 * | 6/2010 | Dix | A01B 69/008 701/50 |
| 7,844,378 B2 | 11/2010 | Lange | |
| 7,860,628 B2 * | 12/2010 | Lange | G01C 21/20 701/25 |
| 8,112,201 B2 | 2/2012 | Aral | |
| 8,209,075 B2 | 6/2012 | Senneff et al. | |
| 8,489,290 B1 | 7/2013 | Lange | |
| 8,655,559 B2 | 2/2014 | Peake et al. | |
| 9,374,939 B2 | 6/2016 | Pickett et al. | |
| 9,795,074 B2 * | 10/2017 | Stratton | A01B 79/005 |

(Continued)

OTHER PUBLICATIONS

European Search Report Corresponding to EP22213075 on May 25, 2023.

*Primary Examiner* — Mussa A Shaawat
(74) *Attorney, Agent, or Firm* — Rickard K. DeMille; Rebecca L. Henkel; Peter K. Zacharias

(57) ABSTRACT

A work vehicle includes a computing system is configured to access a swath line corresponding to a pass to be made across a field by the work vehicle. Furthermore, the computing system is configured to control the operation of the work vehicle such that the vehicle travels along the swath line to make the pass across the field. Additionally, the computing system is configured to determine an operating parameter of the work vehicle as the vehicle travels along the swath line. Moreover, the computing system is configured to adjust a portion of the swath line positioned forward of the work vehicle relative to a direction of travel of the vehicle based on the determined operating parameter as the vehicle travels along the swath line.

17 Claims, 5 Drawing Sheets

(56) References Cited

U.S. PATENT DOCUMENTS

| | | | | |
|---|---|---|---|---|
| 9,974,225 B2* | 5/2018 | Bunderson | ............ | B60W 10/20 |
| 10,143,126 B2 | 12/2018 | Foster et al. | | |
| 10,251,329 B2 | 4/2019 | Foster et al. | | |
| 10,368,475 B2* | 8/2019 | Wolters | ................ | A01B 69/008 |
| 11,224,154 B2* | 1/2022 | Dix | ...................... | G05D 1/0278 |
| 2009/0265053 A1* | 10/2009 | Dix | ...................... | G05D 1/0219 |
| | | | | 701/26 |
| 2014/0081568 A1* | 3/2014 | Pieper | ................ | G05D 1/0274 |
| | | | | 701/400 |
| 2015/0331423 A1* | 11/2015 | Volger | ................ | G05D 1/0219 |
| | | | | 701/25 |
| 2016/0021813 A1* | 1/2016 | Matthews | ............ | A01B 69/00 |
| | | | | 701/26 |
| 2018/0024549 A1 | 1/2018 | Hurd | | |
| 2019/0124819 A1 | 5/2019 | Madsen et al. | | |
| 2019/0146513 A1* | 5/2019 | Tomita | ................ | A01B 69/008 |
| | | | | 701/50 |
| 2019/0343035 A1 | 11/2019 | Smith et al. | | |
| 2020/0120868 A1* | 4/2020 | Smith | ...................... | A01C 1/00 |
| 2021/0127553 A1* | 5/2021 | Stanhope | ............... | A01B 79/02 |
| 2021/0267115 A1* | 9/2021 | Fjelstad | ............... | G05D 1/0248 |
| 2022/0124957 A1* | 4/2022 | Singh | ................... | A01B 69/004 |
| 2022/0210975 A1* | 7/2022 | Digman | ................. | A01F 15/00 |
| 2022/0225557 A1* | 7/2022 | Cooley | ................ | G05D 1/0274 |

* cited by examiner

SYSTEM AND METHOD FOR ADJUSTING SWATH LINES FOR A WORK VEHICLE

FIELD OF THE INVENTION

The present disclosure generally relates to work vehicles, such as agricultural vehicles or construction vehicles, and, more particularly, to systems and methods for generating swath lines for a work vehicle.

BACKGROUND OF THE INVENTION

Modern farming practices strive to increase yields of agricultural fields. As such, agricultural work vehicles, such as tractors, sprayers, harvesters, and/or the like, are used to perform agricultural operations on a field. In general, when performing an agricultural operation, it is necessary for the work vehicle to make a series of passes across the field. However, it is difficult for an operator to control the work vehicle such that passes are consistent and uniformly spaced apart. Inconsistent or non-uniformly spaced passes may result in lower crop yields and/or inefficient performance of the agricultural operation. In this respect, systems have been developed for generating swath lines or guidance lines for guiding a work vehicle along each pass across the field. While such systems work well, further improvements are needed. For example, in certain instances, the swath lines may need to be adjusted after generation.

Accordingly, an improved system and method for adjusting swath lines for a work vehicle would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a work vehicle. The work vehicle includes a frame configured to support a plurality of components of the work vehicle. Furthermore, the work vehicle includes a sensor configured to capture data indicative of an operating parameter of the work vehicle and a computing system communicatively coupled to the sensor. The computing system is configured to access a swath line corresponding to a pass to be made across a field by the work vehicle. Additionally, the computing system is configured to control an operation of the plurality of components such that the work vehicle travels along the swath line to make the pass across the field. Moreover, the computing system is configured to determine the operating parameter of the work vehicle based on the data captured by the sensor as the work vehicle travels along the swath fine. In addition, the computing system is configured to adjust a portion of the swath line positioned forward of the work vehicle relative to a direction of travel of the work vehicle based on the determined operating parameter as the work vehicle travels along the swath line.

In another aspect, the present subject matter is directed to a system for adjusting swath lines for a work vehicle. The system includes a sensor configured to capture data indicative of an operating parameter of the work vehicle and a computing system communicatively coupled to the sensor. The computing system is configured to access a swath line corresponding to a pass to be made across a field by the work vehicle. Furthermore, the computing system is configured to control an operation of the work vehicle such that the work vehicle travels along the swath line to make the pass across the field. Additionally, the computing system is configured to determine the operating parameter of the work vehicle based on the data captured by the sensor as the work vehicle travels along the swath line. Moreover, the computing system is configured to adjust a portion of the swath line positioned forward of the work vehicle relative to a direction of travel of the work vehicle based on the determined operating parameter as the work vehicle travels along the swath line.

In a further aspect, the present subject matter is directed to a method for adjusting swath lines for a work vehicle. The method includes accessing, with a computing system, a swath line corresponding to a pass to be made across a field by the work vehicle. Furthermore, the method includes controlling, with the computing system, an operation of the work vehicle such that the work vehicle travels along the swath line to make the pass across the field. Additionally, the method includes receiving, with the computing system, sensor data indicative of an operating parameter of the work vehicle. Moreover, the method includes determining, with the computing system, the operating parameter of the work vehicle based on the received sensor data as the work vehicle travels along the swath line. In addition, the method includes adjusting, with the computing system, a portion of the swath line positioned forward of the work vehicle relative to a direction of travel of the work vehicle based on the determined operating parameter as the work vehicle travels along the swath line.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
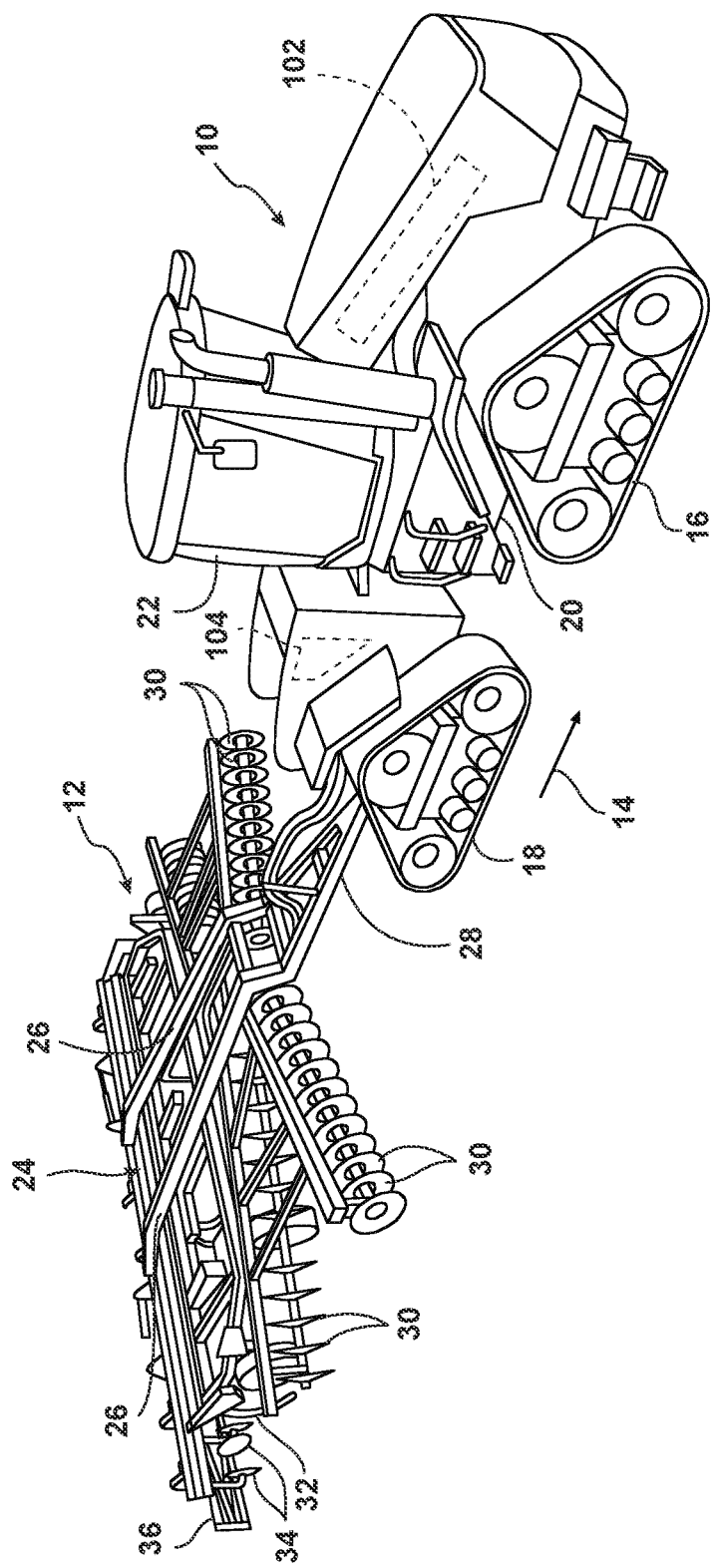
FIG. 1 illustrates a perspective view of one embodiment of a work vehicle and an associated agricultural implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and a method for adjusting swath lines for a work vehicle. As will be described below, the work vehicle includes one or more operating parameter sensors. Each operating parameter sensor, in turn, is configured to capture data indicative of an operating parameter of the work vehicle. For example, the operating parameter(s) may include a vehicle dynamics parameter(s), such as a turning radius of the vehicle, a slew rate of vehicle and an associated implement, and/or a slip of the vehicle. Furthermore, the operating parameter(s) may include a loading parameter(s) of the vehicle.

In several embodiments, a computing system of the disclosed system is configured to adjust a swath line being used to guide the work vehicle across a field based on one or more operating parameters of the vehicle. Specifically, in such embodiments, the computing system is configured to access a swath line corresponding to a pass to be made across a field by the vehicle. For example, the computing system may access a swath line that was generated during a previous operation on the field. Additionally, the computing system is configured to control the operation of the work vehicle such that the work vehicle travels along the accessed swath line to make the pass across the field. Moreover, as the work vehicle travels along the swath line, the computing system is configured to receive the data captured by the operating parameter sensor(s) and determine the operating parameter(s) of the work vehicle based on the received data. Thereafter, as the work vehicle travels along the swath line, the computing system is configured to adjust a portion of the swath line positioned forward of the work vehicle based on the determined operating parameter(s).

Adjusting a swath line used to guide a work vehicle across a field based on an operating parameter(s) of the vehicle determined as the vehicle travels across the field improves the operation of the vehicle. More specifically, as a work vehicle travels across a field, field conditions and/or its loading may affect its performance. As such, in certain instances, the vehicle may be unable to follow the swath line being used to guide the vehicle. For example, the minimum turning radius of a vehicle may be greater in muddy field conditions than in dry field conditions. In this respect, by adjusting the swath line (e.g., by increasing the radius of its curved portions) based on a monitored operating parameter(s), the disclosed system and method ensure that the work vehicle can traverse the swath line as field conditions vary.

In addition, the same field conditions may affect different vehicles differently. For example, the turning radius of one work vehicle may be more impacted by the same muddy conditions than another work vehicle. Furthermore, differing vehicle loading may cause the same field conditions to affect a vehicle differently. Thus, by relying on operating parameters of the vehicle (e.g., vehicle dynamics and/or loading parameter(s)) as opposed to field condition data, the disclosed system and method ensure different work vehicles and vehicles of varying loads can traverse the swath line.

Referring now to the drawings, FIG. 1 illustrates a perspective view of a work vehicle 10 towing an associated agricultural implement 12 across a field in a direction of travel (indicated by arrow 14). In the illustrated embodiment, the work vehicle 10 is configured as an agricultural vehicle (e.g., an agricultural tractor) and the agricultural implement 12 is configured as a tillage implement (e.g., a disk ripper). However, in alternative embodiments, the work vehicle 10 may correspond to any other suitable type of agricultural vehicle (e.g., an agricultural harvester, a self-propelled sprayer, etc.) or construction vehicle (e.g., a dozer, a grader, a loader, etc.) and the agricultural implement 12 may correspond to any other suitable type of agricultural implement (e.g., a seed-planting implement, a towable sprayer, etc.). Additionally, in some embodiments, the vehicle 10 may not be configured to tow an implement.

As shown in FIG. 1, the vehicle 10 includes a pair of front track assemblies 16, a pair of rear track assemblies 18, and a frame or chassis 20 coupled to and supported by the track assemblies 16, 18. An operator's cab 22 may be supported by a portion of the chassis 20 and may house various input devices for permitting an operator to control the operation of one or more components of the vehicle 10 and/or one or more components of the implement 12. Furthermore, the vehicle 10 may include an engine 102 and a transmission 104 mounted on the chassis 20. The transmission 104 may be operably coupled to the engine 102 and may provide variably adjusted gear ratios for transferring engine power to the track assemblies 16, 18 via a drive axle assembly (not shown) (or via axles if multiple drive axles are employed).

Additionally, as shown in FIG. 1, the implement 12 includes a frame 24. More specifically, the frame 24 generally includes a plurality of structural frame members 26, such as beams, bars, and/or the like, which are configured to support or couple to a plurality of components. For example, as will be described below, the frame 24 may be configured to support one or more ground-engaging tools configured to perform an agricultural operation on a field as the implement 12 travels across the field. Furthermore, a hitch assembly 28 may be connected to the frame 24 and configured to couple the implement 12 to the vehicle 10.

In several embodiments, the frame 24 may support one or more gangs or sets of disk blades 30. Each disk blade 30 may, in turn, be configured to penetrate into or otherwise engage the soil as the implement 12 is pulled through the field. In this regard, the various gangs of disk blades 30 may be oriented at an angle relative to the direction of travel 14 to promote more effective tilling of the soil. In the embodiment shown in FIG. 1, the implement 12 includes four gangs of disk blades 30 supported on the frame 24 adjacent to its forward end. However, in alternative embodiments, the implement 12 may include any other suitable number of gangs. Furthermore, in one embodiment, the gangs of disk blades 30 may be mounted to the frame 24 at any other suitable location, such as adjacent to its aft end.

Moreover, in several embodiments, the implement frame 24 may be configured to support other ground-engaging tools. For instance, in the illustrated embodiment, the frame 24 is configured to support a plurality of shanks 32. As shown, the shanks 32 are spaced apart from each other on the frame 24 in a lateral direction of the implement 12. The lateral direction, in turn, extends perpendicular to the direction of travel 14. As such, the shanks 32 are configured to rip or otherwise till the soil as the implement 12 is towed across the field. Furthermore, in the illustrated embodiment, the frame 24 is also configured to support a plurality of leveling blades 34 and a plurality of rolling (or crumbler) basket assemblies 36 positioned aft of the shanks 32. In such an embodiment, the leveling blades 34 may be spaced apart from each other in the lateral direction. However, in other embodiments, any other suitable ground-engaging tools may be coupled to and supported by the implement frame 24.

The configuration of the work vehicle 10 and the associated agricultural implement 12 described above and shown in FIG. 1 is provided only to place the present subject matter in an exemplary field of use. Thus, the present subject matter may be readily adaptable to any manner of work vehicle and/or implement configuration.

Figure 2:
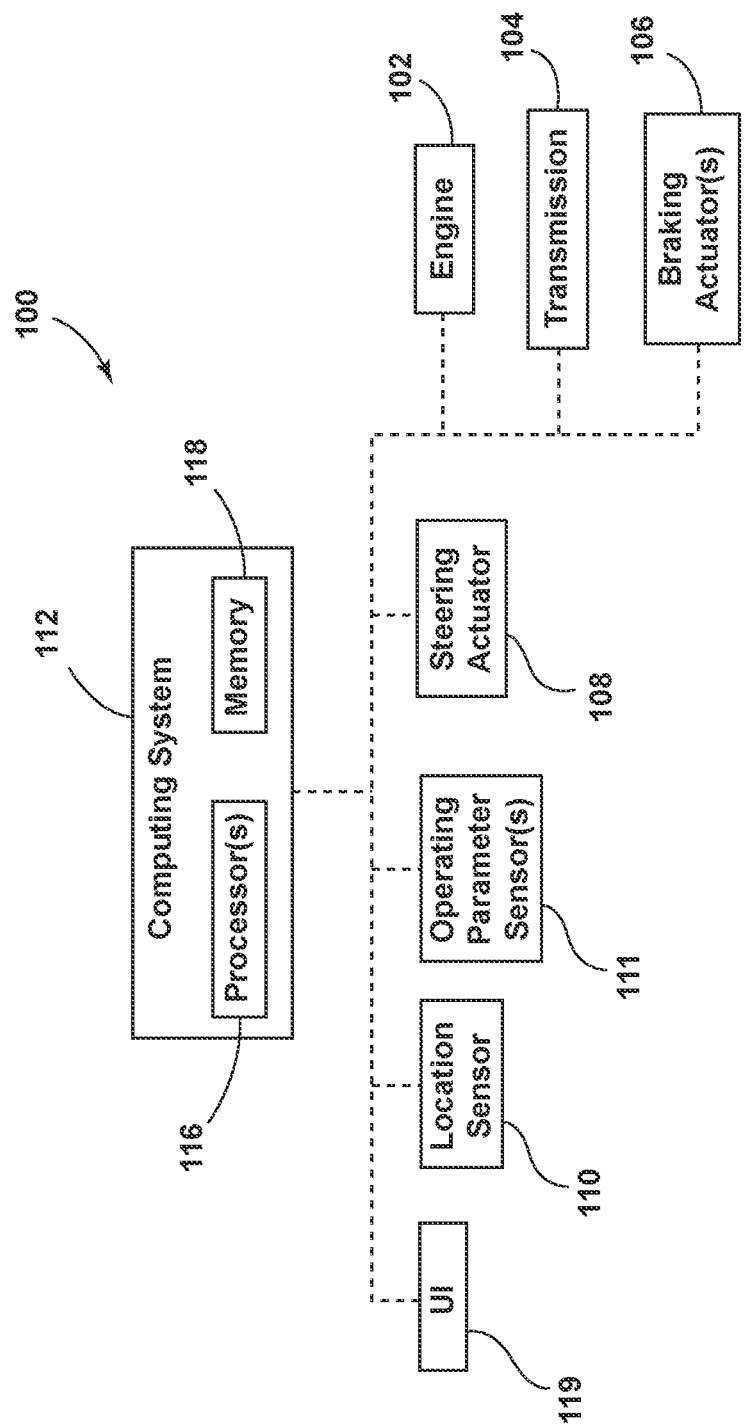
FIG. 2 illustrates a schematic view of one embodiment of a system for adjusting swath lines for a work vehicle in accordance with aspects of the present subject matters.

Referring now to FIG. 2, a schematic view of one embodiment of a system 100 for adjusting swath lines for a work vehicle is illustrated in accordance with aspects of the present subject matter. In general, the system 100 will be described herein with reference to the work vehicle 10 and the agricultural implement 12 described above with reference to FIG. 1. However, the disclosed system 100 may generally be used with work vehicles having any other suitable vehicle configuration and/or agricultural implements having any other suitable implement configuration.

As shown in FIG. 2, the system 100 includes one or more components of the work vehicle 10. For example, in the illustrated embodiment, the system 100 includes the engine 102 and the transmission 104 of the work vehicle 10. Additionally, in the illustrated embodiment, the system 100 includes one or more braking actuators 106 of the vehicle 10. In general, when activated, the braking actuator(s) 106 may reduce the speed at which the vehicle/implement 10/12 moves across the field, such as by converting energy associated with the movement of the vehicle; implement 10/12 into heat. For example, in one embodiment, the braking actuator(s) 106 may correspond to a suitable hydraulic cylinder(s) configured to push a stationary frictional element(s) (not shown), such as a brake shoe(s) or a brake caliper(s), against a rotating element(s) (not shown), such as a brake drum(s) or a brake disk(s). However, in alternative embodiments, the braking actuator(s) 106 may any other suitable hydraulic, pneumatic, mechanical, and/or electrical component(s) configured to convert the rotation of the rotating element(s) into heat.

Furthermore, in several embodiments, the system 100 may include a steering actuator 108 of the work vehicle 10. In general, the steering actuator 108 is configured to adjust the direction of travel 14 of the work vehicle 10. For example, the steering actuator 108 may correspond to an electric motor, an electric linear actuator, a hydraulic cylinder, a pneumatic cylinder, or any other suitable actuator coupled to suitable mechanical assembly, such as a rack and pinion or a worm gear assembly.

Additionally, the system 100 includes a location sensor 110 may be provided in operative association with the work vehicle 10 and/or the implement 12. In general, the location sensor 110 may be configured to determine or otherwise capture data indicative of the current location of the work vehicle 10 and/or the associated implement 12 using a satellite navigation positioning system (e.g., a GPS system, a Galileo positioning system, the Global Navigation satellite system (GLONASS), the BeiDou Satellite Navigation and Positioning system, and/or the like). In such an embodiment, the location data captured by the location sensor 110 may be transmitted to a computing system of the work vehicle 10 and/or the implement 12 (e.g., in the form coordinates) and stored within the computing system's memory for subsequent processing and/or analysis. Thus, the location data received from the location sensor 110 may be used to geo-locate the vehicle 10 within the field, thereby allowing for recording of the travel path of the vehicle/implement 10/12 across the field.

Moreover, the system 100 includes one or more operating parameter sensors 111. In general, each operating parameter sensor 111 is configured to capture data indicative of an operating parameter of the vehicle 10 and/or the associated implement 12. As will be described below, the data captured by the operating parameter sensor(s) 111 is used to adjust at least a portion of a swath line being used to guide the work vehicle 10 across the field to ensure the vehicle 10 can travel along the swath line despite varying field conditions.

In several embodiments, the operating parameter sensor(s) 111 may be configured to capture data indicative of a vehicle dynamics parameter(s). For example, the operating parameter sensor(s) 111 may be configured to capture data indicative of the turning radius of the vehicle 10 (e.g., its maximum wheel angle). Furthermore, the operating parameter sensor(s) 111 may be configured to capture data indicative of the slew rate of the vehicle/implement 10/12 combination. The slew rate, in turn, corresponds to turning rate of the vehicle 10 and the associated implement 12 combination and defines the transition from a straight path to the desired filming radius. Additionally, the operating parameter sensor(s) 111 may be configured to capture data indicative of the lateral slip of the vehicle 10 and the implement 12. Lateral slip, in turn, occurs when the vehicle 10 faces one direction and slides in the opposite direction. Moreover, the operating parameter sensor(s) 111 may be configured to capture data indicative of other types of slip, such as understeer and/or oversteer of the vehicle 10 and/or the implement 12. In this respect, the operating parameter sensor(s) 111 may correspond to any suitable sensor(s) or sensing device(s) configured to capture data indicative of the above parameter(s), such as a potentiometer(s), a Hall effect sensor(s), an accelerometer(s), an IMU(s), and/or the like. However, in alternative embodiments, the operating parameter sensor(s) may be configured to capture data indicative of any other suitable vehicle dynamics parameter(s) in addition to or in lieu of above-described vehicle dynamics parameters.

Additionally, in several embodiments, the operating parameter sensor(s) 111 may be configured to capture data indicative of a vehicle loading parameter(s). For example, the operating parameter sensor(s) 111 may be configured to capture data indicative of the total weight of the vehicle 10 and/or implement 12, the weight on the front axle (not shown) of the vehicle 10, or any other suitable weight/loading parameter(s). As such, the operating parameter sensor(s) 111 may correspond to any suitable sensor(s) or sensing device(s) configured to capture data indicative of the above parameter(s), such as a strain gauge(s), a load cell(s), and/or the like. However, in alternative embodiments, the operating parameter sensor(s) may be configured to capture data indicative of any other suitable vehicle loading parameter(s) or other operating parameter(s) in addition to or in lieu of above-described parameters.

In addition, the system 100 includes a computing system 112 communicatively coupled to one or more components of the work vehicle 10, the implement 12, and/or the system 100 to allow the operation of such components to be electronically or automatically controlled by the computing system 112. For instance, the computing system 112 may be communicatively coupled to the sensors 110 via a communicative link 114, As such, the computing system 112 may be configured to receive data (e.g., coordinates) from the location sensor 110 that is indicative of the location of the vehicle/implement 10/12 within the field. Moreover, the computing system 112 may be communicatively coupled to the operating parameter sensor(s) 111 via the communicative link 114. As such, the computing system 112 may be configured to receive data from the operating parameter sensor(s) 111 that is indicative of one or more operating parameters of the vehicle 10 and/or implement 12. Furthermore, the computing system 112 may be communicatively coupled to various components of the vehicle 10, such as the engine 102, the transmission 104, the braking actuator(s) 106, and/or the steering actuator 108, via the communicative link 114. In this respect, the computing system 112 may be configured to control the operation of such components 102, 104, 106, 108 to the operation of the vehicle/implement 10/12 (e.g., its direction of travel 14, ground speed, etc.). In addition, the computing system 112 may be communicatively coupled to any other suitable components of the vehicle 10, the implement 12, and/or the system 100.

In general, the computing system 112 may comprise one or more processor-based devices, such as a given controller or computing device or any suitable combination of controllers or computing devices. Thus, in several embodiments, the computing system 112 may include one or more processor(s) 116 and associated memory device(s) 118 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 118 of the computing system 112 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 118 may generally be configured to store suitable computer-readable instructions that, when implemented by the processor(s) 116, configure the computing system 112 to perform various computer-implemented functions, such as one or more aspects of the methods and algorithms that will be described herein. In addition, the computing system 112 may also include various other suitable components, such as a communications circuit or module, one or more input/output channels, a data/control bus and/or the like.

The various functions of the computing system 112 may be performed by a single processor-based device or may be distributed across any number of processor-based devices, in which instance such devices may be considered to form part of the computing system 112. For instance, the functions of the computing system 112 may be distributed across multiple application-specific controllers or computing devices, such as a navigation controller, an engine controller, a transmission controller, an implement controller, and/or the like.

In addition, the system 100 may also include a user interface 119. More specifically, the user interface 119 may be configured to provide feedback from the computing system 112 (e.g., feedback associated with the adjusted swath lines) to the operator. As such, the user interface 119 may include one or more feedback devices (not shown), such as display screens, speakers, warning lights, and/or the like, which are configured to provide feedback from the computing system 112 to the operator. As such, the user interface 119 may, in turn, be communicatively coupled to the computing system 112 via the communicative link 114 to permit the feedback to be transmitted from the computing system 112 to the user interface 119. Furthermore, some embodiments of the user interface 119 may include one or more input devices, such as touchscreens, keypads, touchpads, knobs, buttons, sliders, switches, mice, microphones, and/or the like, which are configured to receive inputs from the operator. In one embodiment, the user interface 119 may be mounted or otherwise positioned within the cab 22 of the work vehicle 10. However, in alternative embodiments, the user interface 119 may mounted at any other suitable location.

Figure 3:
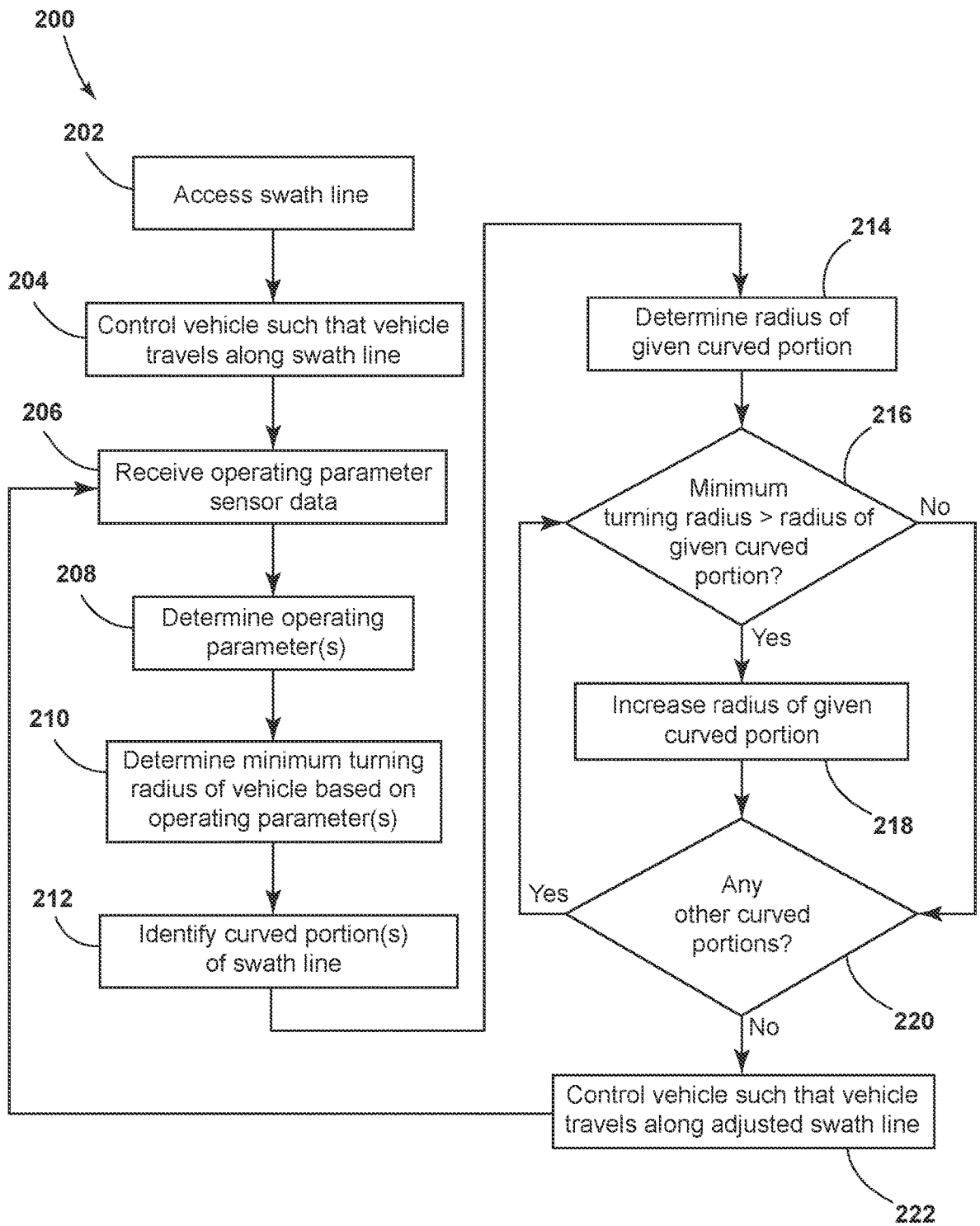
FIG. 3 illustrates a flow diagram providing one embodiment of control logic for adjusting swath lines for a work vehicle in accordance with aspects of the present subject matter.

Referring now to FIG. 3, a flow diagram of one embodiment of control logic 200 that may be executed by the computing system 112 (or any other suitable computing system) for adjusting swath lines for a work vehicle is illustrated in accordance with aspects of the present subject matter. Specifically, the control logic 200 shown in FIG. 3 is representative of steps of one embodiment of an algorithm that can be executed to adjust swath lines for a work vehicle based on one or more operating parameters of the vehicle and/or an associated implement to ensure the vehicle/implement can travel along the swath lines regardless of vehicle performance. Thus, in several embodiments, the control logic 200 may be advantageously utilized in association with a system installed on or forming part of a work vehicle to allow for real-time adjustment of swath lines for a work vehicle without requiring substantial computing resources and/or processing time. However, in other embodiments, the control logic 200 may be used in association with any other suitable system, application, and/or the like for generating swath lines for a work vehicle.

As shown, at (202), the control logic 200 includes accessing a swath line corresponding to a pass to be made across a field by a work vehicle. Specifically, in several embodiments, the computing system 112 may be configured to access a swath line corresponding to a pass to be made across a field (e.g., when performing an agricultural operation) by the vehicle/implement 10/12. For example, in one embodiment, the swath line may be generated during a previous operation (such as by recording the travel path of a vehicle performing the previous operation) and stored in the memory device(s) 118 of the computing system 112. Thereafter, the computing system 112 may retrieve the stored swath line from the memory device(s) 118 before performing the corresponding pass across the field.

Furthermore, at (204), the control logic 200 includes controlling the operation of the work vehicle such that the work vehicle travels along the swath line to make the pass across the field. Specifically, in several embodiments, the computing system 112 is configured to control the operation of one or more components of the work vehicle 10 and/or the associated implement 12 such that the vehicle/implement 10/12 makes a pass across the field (e.g., to perform an agricultural operation thereon). For example, the computing system 112 may receive location data (e.g., coordinates) from the location sensor 110 via the communicative link 114. The received location data may, in turn, be used to determine the position of the vehicle/implement 10/12 relative to the accessed swath line. As such, the computing system 112 may transmit control signals to the steering actuator 108 via the communicative link 114 to control the direction of travel 14 of the vehicle/implement 10/12 such that the vehicle/implement 10/12 travels along the accessed swath line to make the pass.

Additionally, at (206), the control logic 200 includes receiving sensor data indicative of an operating parameter of the work vehicle. Specifically, as mentioned above, in several embodiments, the computing system 112 may be communicatively coupled to the operating parameter sensor(s) 111 via the communicative link 114. In this respect, as the vehicle/implement 10/12 travels along the accessed swath line to make a pass across the field (e.g., to perform an agricultural operation thereon), the computing system 112 may receive data from the operating parameter sensor(s) 111. Such data may, in turn, be indicative of one or more operating parameters of the work vehicle 10 and/or implement 12.

Moreover, at (208), the control logic 200 includes determining the operating parameter of the work vehicle based on the received sensor data as the work vehicle travels along the swath line. Specifically, in several embodiments, as the vehicle/implement 10/12 travels along the accessed swath line to make the pass, the computing system 112 may determine one or more operating parameters of the work vehicle 10 and/or the implement 12 based on the sensor data received at (206).

At (208), any suitable operating parameter(s) of the vehicle 10 and/or the implement 12 may be determined. For example, in some embodiments, the determined operating parameter(s) may include one or more vehicle dynamics parameters, such as the turning radius of the vehicle 10, the slew rate of the vehicle 10 and the implement 12, the lateral slip of the vehicle 10, the understeer and/or oversteer of the vehicle 10, and/or the like. Additionally, or alternatively, the determined operating parameter(s) may include one or more vehicle loading parameters, such as the total weight of the vehicle 10 an for the implement 12, the weight on the front axle of the vehicle 10, and/or the like.

As will be described below, the operating parameter(s) determined at (208) is used to adjust accessed swath line to ensure the vehicle/implement 10/12 can travel along the swath line as the performance of the vehicle/implement 10/12 (e.g., its turning radius/slew rate) varies because of the field conditions. For example, the curved portion(s) of accessed swath line may be adjusted based on the determined operating parameter(s).

In addition, at (210), the control logic 200 includes determining the minimum turning radius of the work vehicle based on the determined operating parameter. More specifically, field conditions may impact the performance of the vehicle 10 and/or the implement 12. For example, when the field is muddy, the minimum turning radius of the vehicle 10 and the minimum slew rate of the vehicle 10 and implement 12 may be less than when the field is dry. Thus, the minimum turning and slew radii may differ as field conditions vary. Moreover, vehicle loading may affect the minimum turning and slew radii. As such, in several embodiments, the computing system 112 may determine the minimum turning radius of the vehicle 10 and/or the minimum slew rate of the vehicle 10 and implement 12 based the determined operating parameter(s). For example, in one embodiment, the computing system 112 may use the determined turning radius of the vehicle 10 and the steering angle of the vehicle 10 to determine the minimum turning radius of the vehicle 10 under the current field conditions and/or vehicle loading.

Furthermore, at (212), the control logic 200 includes identifying a curved portion of the accessed swath line positioned forward of the work vehicle relative to the direction of travel. Specifically, in several embodiments, the computing system 112 may analyze the portion of the accessed swath line positioned forward of the vehicle/implement 10/12 relative to the direction of travel 14 to identify any curved portions thereof. For example, the computing system 112 may use any suitable algorithm(s) or technique(s) to identify the curved portion(s) of the accessed swath line. Moreover, in some embodiments, at (212), the computing system 112 may determine the rate of change of the curvature of the curved portion.

Additionally, at (214), the control logic 200 includes determining the radius of a given identified curved portion. Specifically, in several embodiments, the computing system 112 may determine the radius of a given curved portion of the swath line identified at (212). For example, the computing system 112 may use any suitable algorithm(s) or technique(s) to determine the radius of the given curved portion.

Moreover, at (216), the control logic 200 includes comparing the determined minimum turning radius of the work vehicle to the determined radius of the given identified curved portion. Specifically, in several embodiments, the computing system 112 may compare the minimum turning radius of the work vehicle 10 and/or the slew angle of the vehicle 10 and the implement 12 determined at (210) to the radius of the given identified curved portion determined at (214). When the minimum turning radius of the work vehicle 10 the vehicle 10 and the implement 12 is less the radius of the given curved portion, no adjustment of the given curved portion of the swath line is needed. In such instances, the control logic 200 proceeds to (220). Conversely, when the minimum turning radius of the work vehicle 10 of the vehicle 10 and the implement 12 is greater the radius of the given identified curved portion, the vehicle 10 and/or implement 12 are unable to traverse the given curved portion. In such instances, the control logic 200 proceeds to (218).

Additionally, or an alternative, at (216), the computing system 112 may compare the determined rate of change of the curvature of the curved portion determined at (212) to the predetermined maximum rate of change. When the determined rate of change of the curvature is less the predetermined maximum rate of change, no adjustment of the given curved portion of the swath line is needed. In such instances, the control logic 200 proceeds to (220). Conversely, when the determined rate of change of the curvature is greater the predetermined maximum rate of change, the vehicle 10 and/or implement 12 are unable to traverse the given curved portion. In such instances, the control logic 200 proceeds to (218).

In addition, at (218), the control logic 200 includes adjusting the given curved portion of the accessed swath line such that the radius of the given curved portion is increased. Specifically, in such instances, the computing system 112 may adjust the given curved portion of the accessed swath line such that its radius is increased, thereby allowing the vehicle/implement 10/12 to travel long the adjusted portion. For example, the radius of the given curved portion may be increased to be equal to or greater than (e.g., five percent greater than) than the minimum turning radius or slew radii (e.g., whichever is larger).

Figure 4:
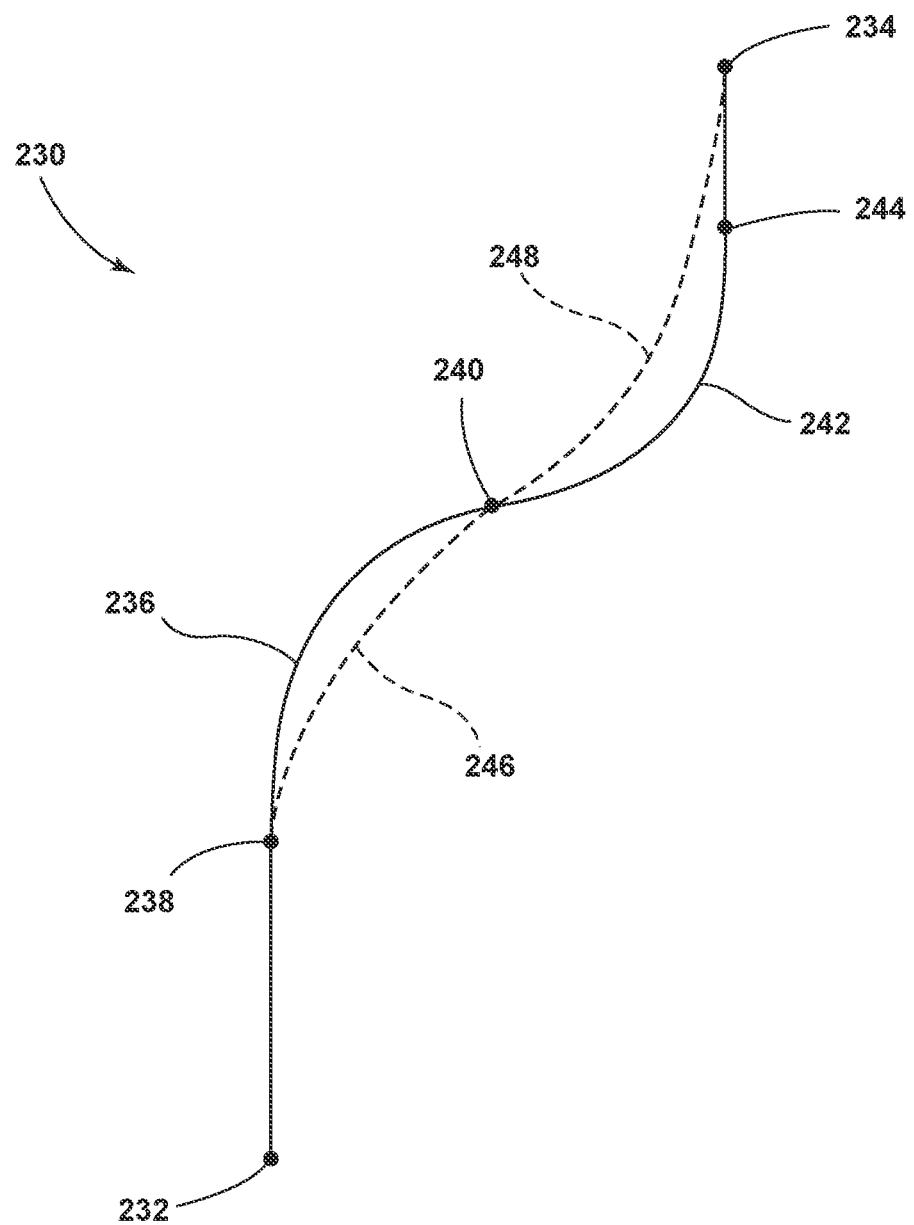
FIG. 4 illustrates a diagrammatic view of an example swath line for use in guiding a work vehicle across a field in accordance with aspects of the present subject matter.

For example, FIG. 4 illustrates an example swath line 230 for use in guiding the vehicle/implement 10/12 across the field. More specifically, the swath line 230 extends from a point 232 to a point 234. Furthermore, the swath line 130 includes a first curved portion 236 extending from a point 238 to a point 240 and a second curved portion 242 extending from a point 240 to a point 244. As shown, the first and second curved portions 236, 242 have been adjusted (e.g., as indicated by dashed lines 246 and 248, respectively) to increase their radii. Thus, the minimum turning and slew radii needed to traverse the adjusted curved portions 246, 248 is greater, thereby allowing vehicle/implement 10/12 to travel along these portions, such as in muddy conditions or under high vehicle loading.

Referring again to FIG. 3, at (220), the control logic 200 includes determining whether there are any other curved portions of the accessed swath that need to be analyzed. Specifically, in several embodiments, after analyzing and, if necessary, adjusting the given curved portion of the swath line at (214)-(218), the computing system 112 is configured to determine whether there are any other curved portions of the accessed swath that need to be analyzed. When another curved portion of the swath line needs to be analyzed, the control logic 200 returns to (214). Conversely, when there are no other curved portions of the swath line that need to be analyzed, the control logic 200 proceeds to (222).

Moreover, at (222), the control logic 200 includes controlling the operation of the work vehicle such that the work vehicle travels along the adjusted portion of the swath line. Specifically, in several embodiments, the computing system 112 is configured to configured to control the operation of one or more components of the work vehicle 10 and/or the associated implement 12 such that the vehicle/implement 10/12 travels along the adjusted swath line. For example, the computing system 112 may use the received location data to determine the position of the vehicle/implement 10/12 relative to the adjusted swath line. In this respect, the computing system 112 may transmit control signals to the steering actuator 108 via the communicative link 114 to control the direction of travel 14 of the vehicle/implement 10/12 such that the vehicle/implement 10/12 travels along the adjusted swath line to make the pass. Thereafter, the control logic 200 may return to (206).

Adjusting a swath line used to guide the work vehicle/implement 10/12 across a field based on an operating parameter(s) determined as the vehicle/implement 10/12 travels across the field improves the operation of the vehicle 10 and/or the implement 12. More specifically, as described above, field conditions and/or vehicle loading may affect the performance the vehicle 10 and/or the implement 12. As such, in certain instances, the vehicle/implement 10/12 may be unable to follow the swath line being used to guide the vehicle. In this respect, by adjusting the swath line (e.g., by increasing the radius of its curved portions) based on a monitored operating parameter(s), the control logic 200 ensures that the vehicle implement 10/12 can traverse the swath line as field conditions and/or vehicle loading vary.

In addition, the same field conditions may affect different vehicles differently. For example, the turning radius of one work vehicle may be more impacted by the same muddy conditions than another work vehicle. Furthermore, differing vehicle loading may cause the same field conditions to affect a vehicle differently. Thus, by relying on operating parameters of the vehicle (e.g., vehicle dynamics and/or loading parameter(s)) as opposed to field condition data, the control logic 200 ensure different work vehicles and vehicles of varying loads can traverse the swath line.

Figure 5:
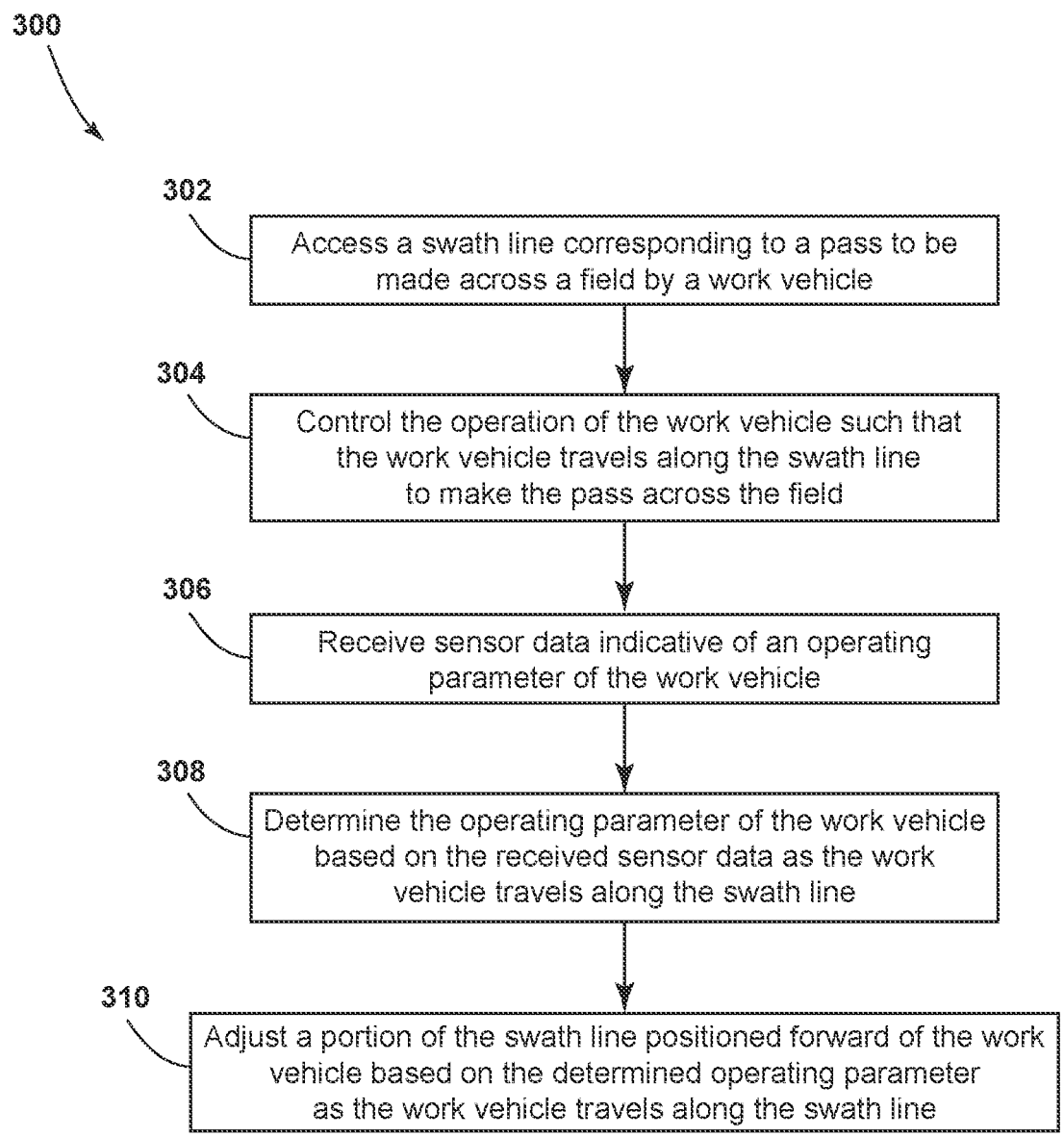
FIG. 5 illustrates a flow diagram of one embodiment of a method for adjusting swath lines for a work vehicle in accordance with aspects of the present subject matter.

Referring now to FIG. 5, a flow diagram of one embodiment of a method 300 for adjusting swath lines for a work vehicle is illustrated in accordance with aspects of the present subject matter. In general, the method 300 will be described herein with reference to the work vehicle 10, the agricultural implement 12, and the system 100 described above with reference to FIGS. 1-4. However, the disclosed method 300 may generally be implemented with any work vehicle having any suitable vehicle configuration, with any agricultural implement having any suitable implement configuration, and/or any within system having any suitable system configuration. In addition, although FIG. 5 depicts steps performed in a particular order for purposes of illustration and discussion, the methods discussed herein are not limited to any particular order or arrangement. The various steps of the methods disclosed herein can be omitted, rearranged, combined, and/or adapted in various ways without deviating from the scope of the present disclosure.

As shown in FIG. 5, at (302), the method 300 includes accessing, with a computing system, a swath line corresponding to a pass to be made across a field by the work vehicle. For example, as described above, the computing system 112 may be configured to access a swath line (e.g., stored within its memory device(s) 118) corresponding to a pass to be made across a field by the work vehicle/implement 10/12.

Additionally, at (304), the method 300 includes controlling, with the computing system, the operation of the work vehicle such that the work vehicle travels along the swath line to make the pass across the field. For example, as described above, the computing system 112 may be configured to control the operation of one or more components of the work vehicle/implement 10/12 (e.g., the steering actuator 108) such that the work vehicle/implement 10/12 travels along the swath line to make the pass across the field.

Moreover, as shown in FIG. 5, at (306), the method 300 includes receiving, with the computing system, sensor data indicative of an operating parameter of the work vehicle. For instance, as described above, the computing system 112 may be configured to receive data from the operating parameter sensor(s) 111 that is indicative of an operating parameter(s) of the work vehicle 10 and/or the implement 12.

Furthermore, at (308), the method 300 includes determining, with the computing system, the operating parameter of the work vehicle based on the received sensor data as the work vehicle travels along the swath line. For instance, as described above, the computing system 112 may be configured to determine the operating parameter(s) of the work vehicle 10 and/or the implement 12 based on the received sensor data as the vehicle/implement 10/12 travels along the swath line.

In addition, at (310), the method 300 includes adjusting, with the computing system, a portion of the swath line positioned forward of the work vehicle relative to a direction of travel of the work vehicle based on the determined operating parameter as the work vehicle travels along the swath line. For instance, as described above, the computing system 112 may be configured to adjust at least a portion of the swath line positioned forward of the vehicle/implement 10/12 relative to the direction of travel 14 based on the determined operating parameter as the vehicle/implement 10/12 travels along the swath line.

It is to be understood that the steps of the control logic 200 and the method 300 are performed by the computing system 112 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 112 described herein, such as the control logic 200 and the method 300, is implemented in software code or instructions which are tangibly stored on a tangible computer readable medium. The computing system 112 loads the software code or instructions via a direct interface with the computer readable medium or via a wired and/or wireless network. Upon loading and executing such software code or instructions by the computing system 112, the computing system 112 may perform any of the functionality of the computing system 112 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A work vehicle, comprising:
a frame configured to support a plurality of components of the work vehicle;
a sensor configured to capture data indicative of a lateral slip of the work vehicle, an understeer of the work vehicle, an oversteer of the work vehicle, or a loading parameter of the work vehicle; and
a computing system communicatively coupled to the sensor, the computing system configured to:
access a swath line corresponding to a pass to be made across a field by the work vehicle;
control an operation of the plurality of components such that the work vehicle travels along the swath line to make the pass across the field;
determine the lateral slip of the work vehicle, the understeer of the work vehicle, the oversteer of the work vehicle, or the loading parameter of the work vehicle based on the data captured by the sensor as the work vehicle travels along the swath line; and
adjust a portion of the swath line positioned forward of the work vehicle relative to a direction of travel of the work vehicle based on the lateral slip of the work vehicle, the understeer of the work vehicle, the oversteer of the work vehicle, or the loading parameter of the work vehicle as the work vehicle travels along the swath line.

2. The work vehicle of claim 1, wherein the computing system is further configured to control the operation of the plurality of components such that the work vehicle travels along the adjusted portion of the swath line.

3. The work vehicle of claim 1, wherein, when adjusting the portion of the swath line, the computing system is further configured to adjust one or more curved portions of the swath line based on the lateral slip of the work vehicle, the understeer of the work vehicle, the oversteer of the work vehicle, or the loading parameter of the work vehicle.

4. The work vehicle of claim 1, wherein, when adjusting at least the portion of the swath line, the computing system is further configured to:
identify a curved portion of the accessed swath line positioned forward of the work vehicle relative to the direction of travel;
determine a radius of the identified curved portion;
determine a minimum turning radius of the work vehicle based on the lateral slip of the work vehicle, the understeer of the work vehicle, the oversteer of the work vehicle, or the loading parameter of the work vehicle;
compare the radius of the identified curved portion and the minimum turning radius of the work vehicle; and
when the radius of the identified curved portion falls below the minimum turning radius of the work vehicle, adjust the identified curved portion of the accessed swath line.

5. The work vehicle of claim 4, wherein, when adjusting the identified curved portion of the accessed swath line, the computing system is further configured to adjust the adjust the identified curved portion of the accessed swath line such that the radius of the identified curved portion is increased.

6. The work vehicle of claim 1, wherein the work vehicle is configured to tow an agricultural implement across the field such that the agricultural implement performs an agricultural operation on the field.

7. A system for adjusting swath lines for a work vehicle, the system comprising:
a sensor configured to capture data indicative of a lateral slip of the work vehicle, an understeer of the work vehicle, an oversteer of the work vehicle; and
a computing system communicatively coupled to the sensor, the computing system configured to:
access a swath line corresponding to a pass to be made across a field by the work vehicle;
control an operation of the work vehicle such that the work vehicle travels along the swath line to make the pass across the field;
determine the lateral slip of the work vehicle, the understeer of the work vehicle, or the oversteer of the work vehicle based on the data captured by the sensor as the work vehicle travels along the swath line; and
adjust a portion of the swath line positioned forward of the work vehicle relative to a direction of travel of the work vehicle based on the lateral slip of the work vehicle, the understeer of the work vehicle, or the oversteer of the work vehicle as the work vehicle travels along the swath line.

8. The system of claim 7, wherein the computing system is further configured to control the operation of the work vehicle such that the work vehicle travels along the adjusted portion of the swath line.

9. The system of claim 7, wherein, when adjusting the portion of the swath line, the computing system is further configured to adjust one or more curved portions of the swath line based on the lateral slip of the work vehicle, the understeer of the work vehicle, or the oversteer of the work vehicle.

10. The system of claim 7, wherein, when adjusting at least the portion of the swath line, the computing system is further configured to:

identify a curved portion of the accessed swath line positioned forward of the work vehicle relative to the direction of travel;

determine a radius of the identified curved portion;

determine a minimum turning radius of the work vehicle based on the lateral slip of the work vehicle, the understeer of the work vehicle, or the oversteer of the work vehicle;

compare the radius of the identified curved portion and the minimum turning radius of the work vehicle; and when the radius of the identified curved portion falls below the minimum turning radius of the work vehicle, adjust the identified curved portion of the accessed swath line.

11. The system of claim 10, wherein, when adjusting the identified curved portion of the accessed swath line, the computing system is further configured to adjust the adjust the identified curved portion of the accessed swath line such that the radius of the identified curved portion is increased.

12. The system of claim 7, wherein the operating parameter further comprises a loading parameter of the work vehicle.

13. A method for adjusting swath lines for a work vehicle, the method comprising:

accessing, with a computing system, a swath line corresponding to a pass to be made across a field by the work vehicle;

controlling, with the computing system, an operation of the work vehicle such that the work vehicle travels along the swath line to make the pass across the field;

receiving, with the computing system, sensor data indicative of a lateral slip of the work vehicle, an understeer of the work vehicle, an oversteer of the work vehicle, or a loading parameter of the work vehicle;

determining, with the computing system, the lateral slip of the work vehicle, the understeer of the work vehicle, the oversteer of the work vehicle, or the loading parameter of the work vehicle based on the received sensor data as the work vehicle travels along the swath line; and adjusting, with the computing system, a portion of the swath line positioned forward of the work vehicle relative to a direction of travel of the work vehicle based on the the lateral slip of the work vehicle, the understeer of the work vehicle, the oversteer of the work vehicle, or the loading parameter as the work vehicle travels along the swath line.

14. The method of claim 13, further comprising:

controlling, with the computing system, the operation of the work vehicle such that the work vehicle travels along the adjusted portion of the swath line.

15. The method of claim 13, wherein adjusting the portion of the swath line comprises adjusting, with the computing system, one or more curved portions of the swath line based on the the lateral slip of the work vehicle, the understeer of the work vehicle, the oversteer of the work vehicle, or the loading parameter of the work vehicle.

16. The method of claim 13, wherein adjusting the portion of the swath line comprises:

identifying, with the computing system, a curved portion of the accessed swath line positioned forward of the work vehicle relative to the direction of travel;

determining, with the computing system, a radius of the identified curved portion;

determining, with the computing system, a minimum turning radius of the work vehicle based on the the lateral slip of the work vehicle, the understeer of the work vehicle, the oversteer of the work vehicle, the loading parameter of the work vehicle, or a rate of change of a curvature of the curved portion on the determined radius;

comparing, with the computing system, the radius of the identified curved portion and the minimum turning radius of the work vehicle or the rate of change of the curvature of the curved portion to a predetermined maximum rate of change; and when the radius of the identified curved portion falls below the minimum turning radius of the work vehicle or the rate of change of the curvature of the curved portion exceeds the predetermined maximum rate of change, adjusting, with the computing system, the identified curved portion of the accessed swath line.

17. The method of claim 16, wherein adjusting the portion of the swath line further comprises adjusting, with the computing system, the identified curved portion of the accessed swath line such that the radius of the identified curved portion is increased.

* * * * *